(12) United States Patent
Zurlo et al.

(10) Patent No.: US 8,108,128 B2
(45) Date of Patent: Jan. 31, 2012

(54) CONTROLLING EXHAUST GAS RECIRCULATION

(75) Inventors: James Richard Zurlo, Madison, WI (US); Kevin Paul Konkle, West Bend, WI (US); Andrew May, Milwaukee, WI (US)

(73) Assignee: Dresser, Inc., Addison, TX (US)

( * ) Notice: Subject to any disclaimer, the term of this patent is extended or adjusted under 35 U.S.C. 154(b) by 0 days.

(21) Appl. No.: 12/415,026

(22) Filed: Mar. 31, 2009

(65) Prior Publication Data

US 2010/0242936 A1 Sep. 30, 2010

(51) Int. Cl.
*F02B 47/08* (2006.01)
*F02M 25/07* (2006.01)
*F02D 41/26* (2006.01)

(52) U.S. Cl. .................. 701/108; 701/106; 123/568.21; 123/674

(58) Field of Classification Search ............. 123/568.11, 123/568.14, 436, 672, 674, 698, 480, 568.19, 123/568.21; 701/108, 103, 106, 109; 60/284–285
See application file for complete search history.

(56) References Cited

U.S. PATENT DOCUMENTS

| 4,184,461 A | 1/1980 | Leung |
| 4,372,119 A | 2/1983 | Gillbrand et al. |
| 4,603,674 A | 8/1986 | Tanaka |
| 4,700,677 A | 10/1987 | Bonitz et al. |
| 4,708,094 A | 11/1987 | Helmich et al. |
| 4,788,957 A | 12/1988 | Komurasaki |
| 4,864,991 A | 9/1989 | Snyder et al. |
| 4,867,127 A | 9/1989 | Quirchmayr et al. |
| 4,905,649 A | 3/1990 | Washino et al. |
| 5,140,959 A | 8/1992 | Durbin |
| 5,150,690 A | 9/1992 | Carter et al. |
| 5,224,457 A | 7/1993 | Arsenault et al. |
| 5,237,983 A | 8/1993 | Willey et al. |
| 5,315,973 A | 5/1994 | Hill et al. |
| 5,400,762 A | 3/1995 | Fodale et al. |
| 5,408,967 A | 4/1995 | Foster |
| 5,467,755 A | 11/1995 | Konrad et al. |
| 5,469,831 A | 11/1995 | Takahashi |
| 5,515,280 A | 5/1996 | Suzuki |
| 5,551,236 A | 9/1996 | Zimmer et al. |

(Continued)

FOREIGN PATENT DOCUMENTS

DE 4117440 12/1991

(Continued)

OTHER PUBLICATIONS

International Search Report and Written Opinion of the International Searching Authority issued in International Application No. PCT/US2010/029443 on Aug. 11, 2010; 10 pages.

(Continued)

*Primary Examiner* — Hai H Huynh
(74) *Attorney, Agent, or Firm* — Woodcock Washburn LLP

(57) ABSTRACT

In controlling an engine, an amount of an intake charge provided, during operation of the engine, to a combustion chamber of the engine is determined. The intake charge includes an air component, a fuel component and a diluent component. An amount of the air component of the intake charge is determined. An amount of the diluent component of the intake charge is determined utilizing the amount of the intake charge, the amount of the air component and, in some instances, the amount of the fuel component. An amount of a diluent supplied to the intake charge is adjusted based at least in part on the determined amount of diluent component of the intake charge.

21 Claims, 6 Drawing Sheets

U.S. PATENT DOCUMENTS

| | | | |
|---|---|---|---|
| 5,586,537 | A | 12/1996 | Tomisawa et al. |
| 5,605,044 | A | 2/1997 | Zimmer et al. |
| 5,611,204 | A | 3/1997 | Radovanovic |
| 5,617,726 | A | 4/1997 | Sheridan et al. |
| 5,628,296 | A | 5/1997 | Herrington et al. |
| 5,632,144 | A | 5/1997 | Isobe |
| 5,655,493 | A | 8/1997 | Enright et al. |
| 5,657,732 | A | 8/1997 | Wolters et al. |
| 5,709,196 | A | 1/1998 | Coleman et al. |
| 5,711,272 | A | 1/1998 | Maegawa et al. |
| 5,713,336 | A | 2/1998 | King et al. |
| 5,732,681 | A | 3/1998 | Ogita |
| 5,816,047 | A | 10/1998 | Zurlo |
| 5,817,923 | A | 10/1998 | Ohsaki et al. |
| 5,832,896 | A | 11/1998 | Phipps |
| 5,832,905 | A | 11/1998 | King et al. |
| 5,878,717 | A * | 3/1999 | Zur Loye ............ 123/435 |
| 5,911,210 | A | 6/1999 | Flach |
| 5,929,314 | A | 7/1999 | Bergkvist et al. |
| 5,949,146 | A | 9/1999 | VandenBerghe |
| 5,950,432 | A | 9/1999 | Zimmer et al. |
| 6,012,431 | A * | 1/2000 | Itoyama et al. ......... 123/480 |
| 6,032,617 | A | 3/2000 | Willi et al. |
| 6,041,756 | A | 3/2000 | Bonne |
| 6,062,204 | A | 5/2000 | Cullen |
| 6,134,888 | A | 10/2000 | Zimmer et al. |
| 6,161,384 | A | 12/2000 | Reinbold et al. |
| 6,189,523 | B1 | 2/2001 | Weisbrod et al. |
| 6,202,601 | B1 | 3/2001 | Ouellette et al. |
| 6,227,182 | B1 * | 5/2001 | Muraki et al. ......... 123/568.21 |
| 6,230,683 | B1 | 5/2001 | zur Loye et al. |
| 6,246,952 | B1 | 6/2001 | Honda |
| 6,246,953 | B1 | 6/2001 | Quinn et al. |
| 6,247,448 | B1 | 6/2001 | Scholl et al. |
| 6,269,300 | B1 | 7/2001 | Moore-McKee et al. |
| 6,279,560 | B1 | 8/2001 | Mauro et al. |
| 6,289,877 | B1 | 9/2001 | Weisbrod et al. |
| 6,305,167 | B1 | 10/2001 | Weisman, II et al. |
| 6,340,005 | B1 | 1/2002 | Keast et al. |
| 6,386,149 | B1 | 5/2002 | Coleman et al. |
| 6,411,886 | B1 | 6/2002 | Morra et al. |
| 6,427,662 | B2 | 8/2002 | Tanaya et al. |
| 6,439,198 | B2 | 8/2002 | Lehner et al. |
| 6,470,868 | B2 | 10/2002 | Nakagawa et al. |
| 6,474,308 | B1 | 11/2002 | Okumura et al. |
| 6,520,168 | B2 | 2/2003 | Ishii et al. |
| 6,522,024 | B1 | 2/2003 | Takaoka et al. |
| 6,522,959 | B1 | 2/2003 | Sawamura et al. |
| 6,529,815 | B2 | 3/2003 | Hawkins et al. |
| 6,543,395 | B2 | 4/2003 | Green |
| 6,546,328 | B1 | 4/2003 | Slicker |
| 6,564,774 | B2 | 5/2003 | Ellims et al. |
| 6,567,709 | B1 | 5/2003 | Malm et al. |
| 6,591,822 | B2 | 7/2003 | Dohta |
| 6,598,584 | B2 | 7/2003 | Beck et al. |
| 6,609,496 | B1 | 8/2003 | Bruch et al. |
| 6,612,269 | B2 | 9/2003 | Heffel et al. |
| 6,659,090 | B2 | 12/2003 | Sisken |
| 6,668,812 | B2 | 12/2003 | Javaherian |
| 6,694,960 | B2 | 2/2004 | Hess et al. |
| 6,697,729 | B2 * | 2/2004 | Wright ............ 701/104 |
| 6,712,042 | B1 | 3/2004 | Kustosch |
| 6,725,831 | B2 | 4/2004 | Asano et al. |
| 6,728,625 | B2 | 4/2004 | Strubhar et al. |
| 6,729,315 | B2 | 5/2004 | Onodera et al. |
| 6,805,095 | B2 | 10/2004 | Sun et al. |
| 6,837,227 | B2 | 1/2005 | Jaliwala et al. |
| 6,863,052 | B2 | 3/2005 | Takahashi et al. |
| 6,883,318 | B2 | 4/2005 | Warner et al. |
| 6,915,776 | B2 | 7/2005 | zur Loye et al. |
| 7,006,909 | B1 | 2/2006 | May |
| 7,021,298 | B2 | 4/2006 | Nakazawa et al. |
| 7,044,103 | B2 | 5/2006 | May |
| 7,066,144 | B2 | 6/2006 | Harunari et al. |
| 7,104,260 | B2 | 9/2006 | Nakazawa et al. |
| 7,117,862 | B2 | 10/2006 | May |
| 7,124,011 | B2 | 10/2006 | Baxter et al. |
| 7,281,531 | B1 * | 10/2007 | Fulton et al. ............ 123/568.17 |
| 7,296,561 | B2 | 11/2007 | Shirakawa et al. |
| 7,302,884 | B2 | 12/2007 | Donahue |
| 7,360,523 | B2 * | 4/2008 | Sloane et al. ............ 123/305 |
| 7,383,816 | B2 | 6/2008 | Zurlo |
| 7,740,010 | B2 * | 6/2010 | Fulton et al. ............ 123/698 |
| 2001/0020465 | A1 | 9/2001 | Baeuerle et al. |
| 2002/0007816 | A1 | 1/2002 | Zur Loye et al. |
| 2002/0017269 | A1 | 2/2002 | zur Loye et al. |
| 2002/0020388 | A1 | 2/2002 | Wright et al. |
| 2002/0026926 | A1 | 3/2002 | Loye et al. |
| 2002/0029105 | A1 | 3/2002 | Sauler et al. |
| 2002/0072844 | A1 | 6/2002 | Gras et al. |
| 2002/0078918 | A1 | 6/2002 | Ancimer et al. |
| 2002/0148438 | A1 | 10/2002 | Ellims et al. |
| 2002/0185086 | A1 | 12/2002 | Newman et al. |
| 2003/0000574 | A1 | 1/2003 | Cordier et al. |
| 2003/0075158 | A1 | 4/2003 | Milos et al. |
| 2003/0164156 | A1 | 9/2003 | Galtier |
| 2003/0168037 | A1 | 9/2003 | zur Loye et al. |
| 2004/0025831 | A1 | 2/2004 | Landi et al. |
| 2004/0030486 | A1 | 2/2004 | Sauler et al. |
| 2004/0084020 | A1 | 5/2004 | Daniels et al. |
| 2005/0028785 | A1 | 2/2005 | Harunari et al. |
| 2006/0102148 | A1 | 5/2006 | Nakazawa et al. |
| 2006/0117737 | A1 | 6/2006 | Ohsaki |
| 2006/0137660 | A1 | 6/2006 | Shirakawa et al. |
| 2006/0270519 | A1 | 11/2006 | Kamada et al. |
| 2007/0150165 | A1 | 6/2007 | Saikkonen et al. |
| 2009/0076713 | A1 | 3/2009 | Bailey et al. |

FOREIGN PATENT DOCUMENTS

| | | |
|---|---|---|
| DE | 19510592 | 9/1995 |
| DE | 199 41 007 | 3/2001 |
| DE | 10350797 | 5/2005 |
| DE | 10 2004 03025 | 9/2005 |
| EP | 0892164 | 1/1999 |
| EP | 0997628 | 5/2000 |
| EP | 1 020 629 | 7/2000 |
| FR | 2 868 127 | 9/2005 |
| FR | 2 910 929 | 7/2008 |
| GB | 2 156 905 | 10/1985 |
| JP | 04234571 | 8/1992 |
| JP | 2003328861 | 11/2003 |
| JP | 2005054725 | 3/2005 |
| WO | WO 00/61927 | 10/2000 |
| WO | 2004/111416 | 12/2004 |
| WO | 2008/048909 | 4/2008 |

OTHER PUBLICATIONS

Notification of Transmittal of the International Preliminary Report on Patentability (1 page) and International Preliminary Report on Patentability (15 pages) for International Application No. PCT/US2005/016176 mailed Aug. 3, 2006.

International Search Report issued in PCT Application No. PCT/US2005/016176 mailed Sep. 9, 2005 (7 pages).

C. Hudson et al., "Knock Measurement for Fuel Evaluation in Spark Ignition Engines" Fuel, IPC Science and Technology Press, Guildford, GB, vol. 80, No. 3, Feb. 3, 2001.

International Search Report and the Written Opinion of the International Searching Authority issued in PCT Application No. PCT/US2007/000385; Jul. 3, 2007 (11 pages).

International Search Report and the Written Opinion of the International Searching Authority issued in PCT Application No. PCT/US2005/027185; Nov. 17, 2005 (12 pages).

Office Action mailed Jun. 9, 2009 in corresponding Russian Application No. 2006143052 (7 pages).

Office Action mailed Nov. 19, 2008 in corresponding European Application No. 05748317.4 (15 pages).

Office Action mailed Apr. 11, 2008 in corresponding Chinese Application No. 200580020508.7 (11 pages).

Notification of Transmittal of the International Preliminary Report on Patentability (14 pages), mailed Apr. 21, 2011, for related international application PCT/US2010/029443.

* cited by examiner

CONTROLLING EXHAUST GAS RECIRCULATION

The U.S. Government has a paid-up license in this invention and the right in limited circumstances to require the patent owner to license others on reasonable terms as provided for by the terms of DE-FC26-01CH11080 awarded by the Department of Energy.

BACKGROUND

This disclosure relates to internal combustion engines and, more particularly, to operating internal combustion engines having exhaust gas recirculation.

Exhaust gas recirculation ("EGR") involves introduction of a portion of exhaust gases from an internal combustion engine back into a combustion chamber of the internal combustion engine, such as one or more cylinders of the internal combustion engine. EGR can be used to reduce formation of nitrogen oxides, such as, for example, nitrogen oxide (NO) and nitrogen dioxide ($NO_2$) (referred to collectively hereinafter as "NOx"). The exhaust gas is substantially inert. Thus, introducing a portion of the exhaust gas into the combustion chamber of an internal combustion engine dilutes the mixture of fuel and air to be combusted, and resultantly lowers the peak combustion temperature and excess oxygen. As a result, the engine produces reduced amounts of NOx because NOx forms much more quickly at higher temperatures. Thus, EGR reduces or limits the amount of NOx generated during combustion of the engine.

SUMMARY

The present disclosure describes systems and techniques relating to controlling an engine having EGR, for example, by adjusting an air/fuel ratio supplied to the engine, as well as an amount of EGR supplied to the engine.

A method for controlling an engine according to one aspect may include determining an amount of an intake charge provided to a combustion chamber of the engine during operation of the engine. The intake charge may include an air component, a fuel component, and a diluent component. The method may also include determining an amount of the air component of the intake charge and an amount of the diluent component of the intake charge. The amount of diluent component of the intake charge may be determined utilizing the amount of the intake charge and the amount of the air component. The method may further include adjusting an amount of a diluent supplied to the intake charge based at least in part on the determined amount of diluent component of the intake charge.

Another aspect includes an engine control module. The engine control module may include a processor and a memory storing instructions for the processor that cause the processor to perform operations. The operations may include determining an amount of an intake charge provided, during operation of the engine, to a combustion chamber of the engine, the intake charge comprising an air component, a fuel component and a diluent component, and the diluent component comprising exhaust gas. The operations may also include determining an amount of the air component of the intake charge, determining an amount of the diluent component of the intake charge utilizing the amount of the intake charge and the amount of the air component, and adjusting an amount of exhaust gas supplied to the intake charge based at least in part on the determined amount of diluent component of the intake charge and a specified amount of exhaust gas.

A further aspect includes a method for controlling an engine. The method for controlling an engine may include receiving a signal indicative of an amount of air in an intake charge provided, during operation of the engine, to a combustion chamber of the engine, determining an amount of diluent in the intake charge based on the signal indicative of the amount of air in the intake charge, and adjusting an amount of exhaust gas supplied to the intake charge based on the determining amount of diluent.

The various aspects may include one or more of the following features. An amount of the fuel component of the intake charge may be determined. Determining an amount of the diluent component of the intake charge may include determining an amount of the diluent component of the intake charge utilizing the amount of the intake charge, the amount of the air component, and the amount of the fuel component. Adjusting an amount of diluent supplied to the intake charge may include adjusting an amount of exhaust gas introduced into the intake charge. Determining an amount of the fuel component of the intake charge may include measuring a power output by the engine. Determining an amount of the fuel component of the intake charge may include utilizing a duty cycle of an air/fuel control device of the engine. Determining an amount of the air component of the intake charge may include utilizing a mass air flow sensor of the engine. Determining an amount of the air component may include utilizing a lambda sensor of the engine. Determining an amount of an intake charge provided to a combustion chamber of the engine during operation of the engine may include calculating the amount of the intake charge as a function of engine volumetric efficiency, a flow rate of the air component, a density of the air component, and engine speed. Adjusting an amount of a diluent supplied to the intake charge may include adjusting the amount of the diluent supplied to the intake charge to be substantially equal to a specified amount.

The various aspects may also include one or more of the following features. An amount of the fuel component of the intake charge may be determined, and determining an amount of the diluent component of the intake charge may include determining an amount of the diluent component of the intake charge utilizing the amount of the intake charge, the amount of the air component, and the amount of the fuel component. Determining an amount of the fuel component of the intake charge may include measuring a power output by the engine. Determining an amount of the fuel component of the intake charge may include utilizing a duty cycle of an air/fuel control device of the engine. Determining an amount of the fuel component of the intake charge may include utilizing a mass fuel flow sensor or a volume fuel flow sensor. Determining an amount of the air component of the intake charge may include utilizing a mass air flow sensor of the engine. Determining an amount of the air component may include utilizing a lambda sensor of the engine. Determining an amount of an intake charge provided to a combustion chamber of the engine during operation of the engine may include calculating the amount of the intake charge as a function of engine volumetric efficiency, flow rate of the air component, density of the air component, and engine speed.

The various aspects may additionally include one or more of the following features. A signal indicative of an amount of fuel in the intake charge provided, during operation of the engine, to the combustion chamber of the engine may be received. The amount of diluent in the intake charge may be determined based on the signal indicative of the amount of air in the intake charge and the signal indicative of the amount of fuel in the intake charge. Receiving a signal indicative of an amount of fuel in the intake charge provided, during operation of the engine, to the combustion chamber of the engine may include receiving a signal from a load driven by the engine. Determining an amount of diluent in the intake charge based on the signal indicative of the amount of air in the intake charge may include calculating the amount of diluent as a function of engine volumetric efficiency, a flow rate of the air component, a density of the air component, and engine speed.

DETAILED DESCRIPTION

Figure 1:
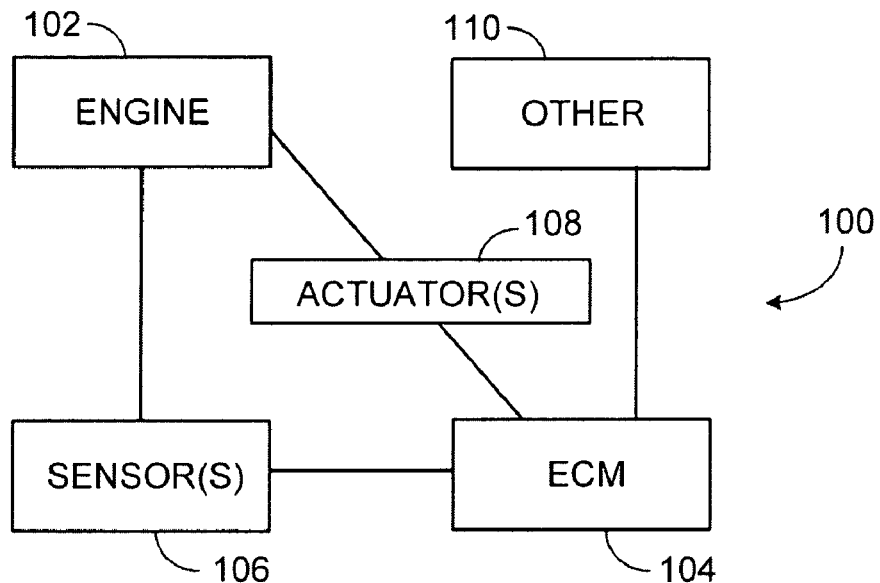
FIG. 1 is a schematic of an illustrative engine system.

Referring first to FIG. 1, one example of an engine system 100 is depicted schematically. The engine system 100 includes an ECM 104 operably coupled to communicate with one or more sensors 106 and one or more actuators 108. The ECM 104 may be a single controller or multiple controllers housed in the same or separate housings. The sensors 106 may be coupled to an internal combustion engine 102 or other component of the engine system 100, and sense one or more operating characteristics of the engine 102 and/or engine system 100 and output a signal representative of the operating characteristic. Some examples of typical engine operating characteristics include engine speed; a torque indicating characteristic, such as Intake Manifold Absolute Pressure (IMAP) or intake manifold density (IMD); a characteristic indicative of the power output of the engine determined from inputs into the engine, such as Brake Mean Effective Pressure (BMEP) or Indicated Mean Effective Pressure (IMEP) or other estimate; a characteristic indicative of the engine's air to fuel ratio, such as exhaust oxygen content; ambient and/or engine temperature; ambient pressure; and others. Some examples of other characteristics that may be measured by sensors 106 include a power output of the engine from outputs of the engine, for example, a generator driven by the engine, a throughput and pressure of a compressor driven by the engine, an engine loading measured with load cell and others. The actuators 108 are adapted to control various engine system components (not specifically shown) used in controlling the engine and other engine system components. Some examples of typical engine components include a throttle, a turbocharger, a turbocharger bypass or wastegate, an ignition system, air/fuel regulating device, such as an adjustable fuel mixer, a fuel pressure regulator, fuel injectors, one or more EGR valves and others. The ECM 104 may also be coupled to communicate with other components 110. Some examples of other components 110 can include a user interface that allows a user to query the ECM 104 or input data or instructions to the ECM 104, one or more external sensors that sense information other than the operating characteristics of the engine or engine system, monitoring or diagnostic equipment to which the ECM 104 can communicate characteristics of the system, a load driven by the engine (e.g., generator, compressor, or other load) and others.

Figure 2:
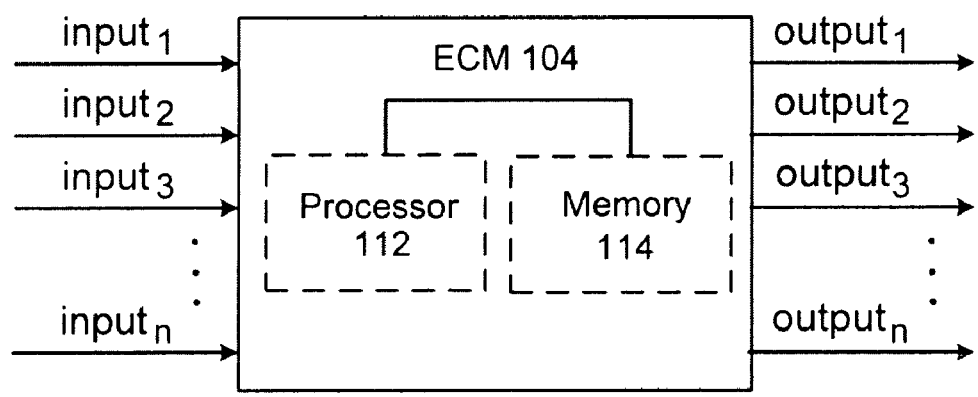
FIG. 2 is a schematic of an illustrative engine control module for use in an engine system.

Referring to FIG. 2, the ECM 104 includes a processor 112 operably coupled to a computer readable medium or memory 114. The computer readable medium 114 may be wholly or partially removable from the ECM 104. The computer readable medium 114 contains instructions used by the processor 112 to perform one or more of the methods described herein. The ECM 104 can receive one or more input signals ($input_1 \ldots input_n$), such as from the sensors 106, actuators 108, and other components 110 and can output one or more output signals ($output_1 \ldots output_n$), such as to the sensors 106, actuators 108 and other components 110.

The ECM 104 operates to accelerate or decelerate the engine 102 (FIG. 1) to a specified operating state, for example a specified speed, torque output, or other specified operating state, and maintain the engine in steady state operation. To this end, the ECM 104 receives input from the sensors 106, including engine state parameters, and determines and outputs one or more actuator control signals adapted to control the actuators 108 to operate the engine 102.

Figure 3:
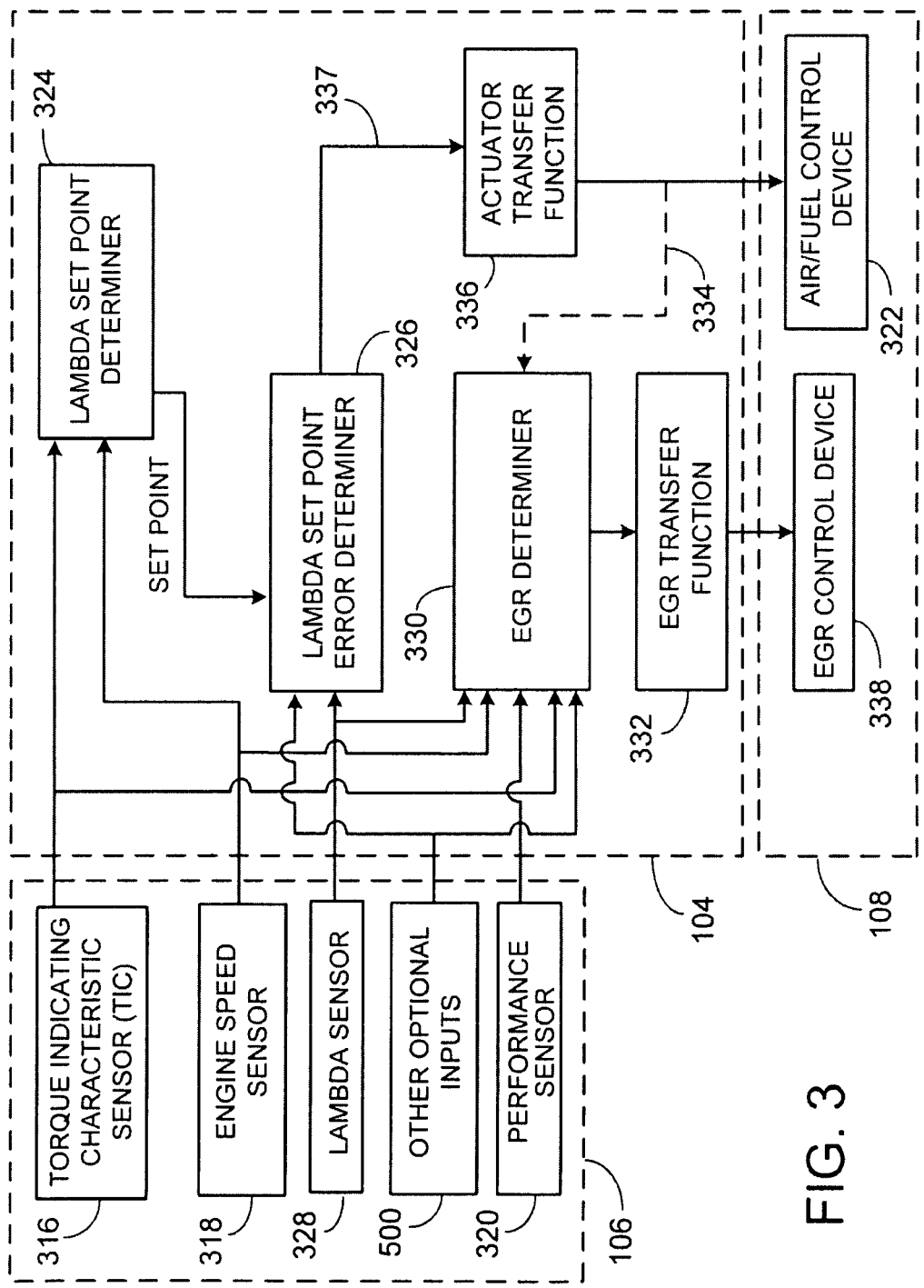
FIG. 3 is a schematic of the functional operation of an illustrative engine controller module ("ECM").

FIG. 3 depicts an illustrative ECM 104 for use in controlling the air/fuel mixture and an amount of EGR supplied to the combustion chamber of an engine 102. Collectively, the air/fuel mixture, the EGR, and any other diluents supplied to the combustion chamber are referred to herein as the intake charge. The illustrative ECM 104 of FIG. 3 receives an input of engine state parameters from the sensors 106, which, in this instance, may include a torque indicating characteristic sensor 316, such as an IMAP or IMD sensor, an engine speed sensor 318, and an engine performance sensor 320 and outputs a signal to the actuators 108. The ECM 104 may also receive additional inputs 500, discussed in more detail below. The additional inputs 500 may include intake manifold pressure and a fuel quality input. Additional, fewer, or different additional inputs may be used in other implementations. The actuators 108 include at least an air/fuel control device 322 operable to control a ratio of air and fuel supplied to the engine 102. Examples of air/fuel control devices 322 include a fuel pressure regulator or air bypass in an engine system using a fixed orifice area air/gas mixer, an adjustable orifice area air/gas mixer, one or more fuel injectors, or other air/fuel control device or combination of devices. The actuators 108 may also include an EGR control device 338 for introducing an amount of EGR to the engine 102. Examples of EGR control devices include vacuum regulators, pressure regulators, a combination pressure and vacuum regulator, servo control valves, combination servo control valve and vacuum regulator, variable area valves (e.g., butterfly valves, gate valves, and ball valves), and combination servo control valve and pressure regulator, or other regulator.

In one implementation, the ECM 104 may include a lambda set-point determiner 324 that receives one or more engine state parameters and determines and outputs a lambda (λ) set-point. The lambda set-point is selected to maintain engine operation substantially in steady state, for example. Lambda is a term that commonly refers to an air-fuel ratio in which a lambda value of 1 refers to a stoichiometric air/fuel mixture. Specifically, lambda is the actual air-fuel ratio divided by the stoichiometric air-fuel ratio. The lambda set-point determiner 324 is used to determine an air/fuel actuator control signal operable to control the air/fuel control device 322. Although FIG. 3 illustrates an implementation where the lambda set-point is the only input to control the air/fuel control device 322, additional or different inputs may be used to determine the air/fuel actuator control signal. For example, certain implementations may use a fuel parameter for compensating for variances in fuel quality or type or engine wear, damage, or modification, in combination with the lambda set-point to determine the air/fuel actuator control signal. An engine control system utilizing a fuel parameter as an input to determine an air/fuel actuator control signal is described in U.S. Pat. No. 7,117,862. In determining a lambda set-point, the illustrative ECM 104 uses engine speed from the engine speed sensor 318, a torque indicating characteristic (e.g., IMAP or IMD) from the torque indicating characteristic sensor 316 and optionally other inputs 500. In some instances, the optional inputs 500 may include ambient temperature, intake temperature (e.g., intake manifold pressure), and/or a fuel parameter, such as the fuel parameter described above. According to certain implementations, the torque indicating characteristic sensor 316 is operable to determine an expected or estimated torque output of the engine 102. Moreover, the torque indicating characteristic sensor 316 may include any sensor, instrument, or device for sensing or otherwise determining a torque output or power output of the engine 102, since, as discussed in detail below, converting between power output and torque output is possible using known engineering relationships. The ECM 104 may use other sensors alternatively or in combination with those discussed above, such as a mass-air sensor, flow volume sensor or other sensor.

In certain implementations, the lambda set-point determiner 324 may determine the lambda set-point using a look-up table in the memory of the ECM 104 including at least values indicative of engine speed and torque indicating characteristics correlated to lambda set-points determined to maintain a specified engine operation state, such as steady state engine operation. Alternately or in combination with a look-up table, the lambda set-point determiner 324 may determine the lambda set-point using a formulaic calculation as a function of inputs from one or more of the sensors 106, for example, engine speed and torque indicating characteristic. In either instance, the lambda set-point is selected in relation to the respective engine speed and torque indicating characteristic values to provide a specified combustion mixture to the engine 102 to maintain a specified engine operating state, such as steady state operation. Therefore, different lambda set-points may effectuate different engine operating states.

The ECM 104 may also include a lambda set-point error determiner 326 for determining an error or difference between the determined lambda set-point and an input indicative of the actual lambda. For example, an error may be determined when the engine 102 is under transient conditions, e.g., whenever the engine's actual lambda condition does not correspond to the lambda set-point, for example. In certain implementations, the lambda set-point error determiner 326 may determine a lambda adjustment 337, i.e., a signal representative of an amount by which to adjust operation of the engine 102.

The lambda sensor 328 measures the actual lambda condition of the engine 102 at any given time by, for example, measuring the amount of oxygen remaining in exhaust gases and sends a corresponding signal to the lambda set-point error determiner 326. The lambda set-point error determiner 326 then compares the actual lambda condition with a lambda set-point received from the lambda set-point determiner 324. The lambda set-point error determiner 326 then determines the amount by which the actual lambda condition should be adjusted (e.g., increased or decreased) in order to achieve a specified engine performance and generates a lambda adjustment 337. That is, based on the comparison between the actual lambda condition and the lambda set-point, an adjustment may be determined if the comparison indicates a deviation between the two values. The lambda set-point error determiner 326 then outputs the lambda adjustment 337 (a positive or negative value, for example) to an actuator transfer function 336. The actuator transfer function 336 receives at least the lambda adjustment 337 and determines an air/fuel actuator control signal adapted to operate the air/fuel control device 322.

Figure 4:
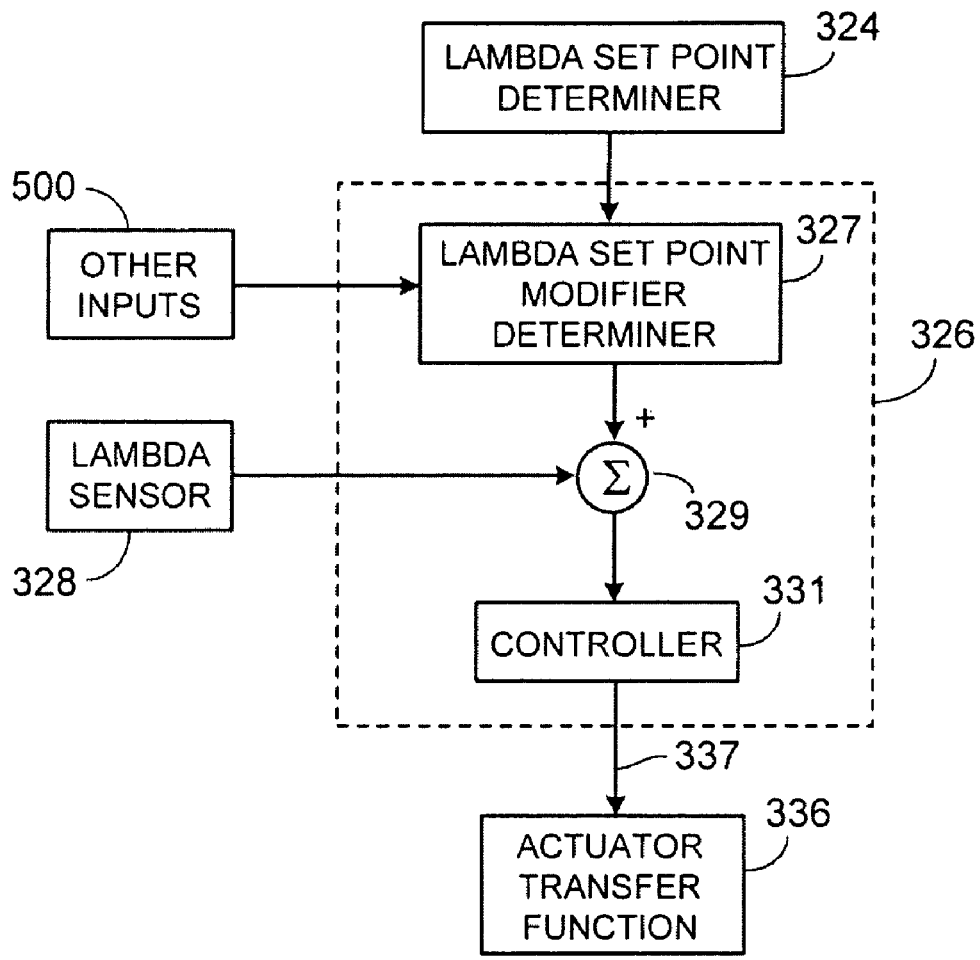
FIG. 4 is an example implementation of a lambda set-point error determiner.

FIG. 4 illustrates an example implementation of the lambda set-point error determiner 326. As shown, the example lambda set-point error determiner 326 may include a summing function 329 and a controller 331. The lambda set-point error determiner 326 may also include a lambda set-point modifier determiner 327. In other implementations, the lambda set-point modifier determiner 327 may be omitted. The lambda set-point modifier determiner 327 receives the set-point from the lambda set-point determiner 324 as well as one or more other inputs 500. For example, the other inputs 500 may be intake manifold pressure and a fuel quality indicator. Other implementations may include additional, fewer, or different inputs. The lambda set-point modifier determiner 327 may be operable to determine a modifier to adjust the lambda set-point from the lambda set-point determiner 324 based on data obtained from the other inputs. Thus, a lambda set-point modifier determiner 327 may be used to alter the determined lambda set-point based on the intake temperature and/or fuel quality.

In some instances, the modifier may be obtained from a look-up table or, alternately, or in combination with a look-up table, the lambda modifier may be determined using a formulaic calculation. The lambda modifier may also be value-specific to a particular lambda set-point. That is, the lambda modifier may be applied only to a single lambda set-point output by the lambda set-point determiner 324 and not to any other lambda set-point subsequently output by lambda set-point determiner 324. According to a further implementation, the lambda modifier may be applied globally to all subsequently determined lambda set-points for a specified period or to a defined group of lambda set-points according to one or more conditions. The lambda set-point modifier determiner 327 applies the determined modifier to the determined set-point and outputs the modified set-point to the summing function 329.

The summing function 329 receives the signal of the actual lambda condition from the lambda sensor 328 and the modified set-point from the lambda set-point modifier determiner 327. The summing function 329 determines whether there is a difference between the actual lambda condition and the determined modified lambda set-point. Any determined difference is sent to the controller 331. For implementations without the lambda set-point modifier determiner 327, the summing function 329 receives the determined set-point from the lambda set-point determiner 324 and the actual lambda condition signal from the lambda sensor 328, determines any difference between the two values, and forwards the difference to the controller 331. According to some implementations, the controller 331 may be a proportional, integral, and derivative (PID) controller. However, any suitable controller may be used. The output of the controller 331 is sent to the actuator transfer function 336, which, as explained above, determines an air/fuel actuator control signal adapted to operate the air/fuel control device 322.

The ECM 104 may further include provisions for transient condition fuel adjustment. In transient conditions, when the engine 102 is accelerated or decelerated in either torque, speed, or both, the air/fuel ratio will tend to lean out (i.e., the lambda will increase) during the acceleration and richen (i.e., the lambda will decrease) during deceleration. To compensate for this effect during acceleration, the ECM 104 may momentarily increase the amount of fuel supplied to the engine when running lean or near stoichiometric (i.e., richens the air/fuel ratio) beyond what is required to operate the engine at the newly specified steady state operating condition. Increasing the amount of fuel supplied during acceleration increases the engine's torque output and produces a more responsive performance and quicker acceptance of an increased torque loading. During deceleration, the ECM 104 may decrease the amount of fuel supplied (i.e., leans air/fuel ratio) below that required by the engine at the newly specified steady state operating condition, helping the engine shed unwanted torque output and prevent over-speeding.

Figure 5:
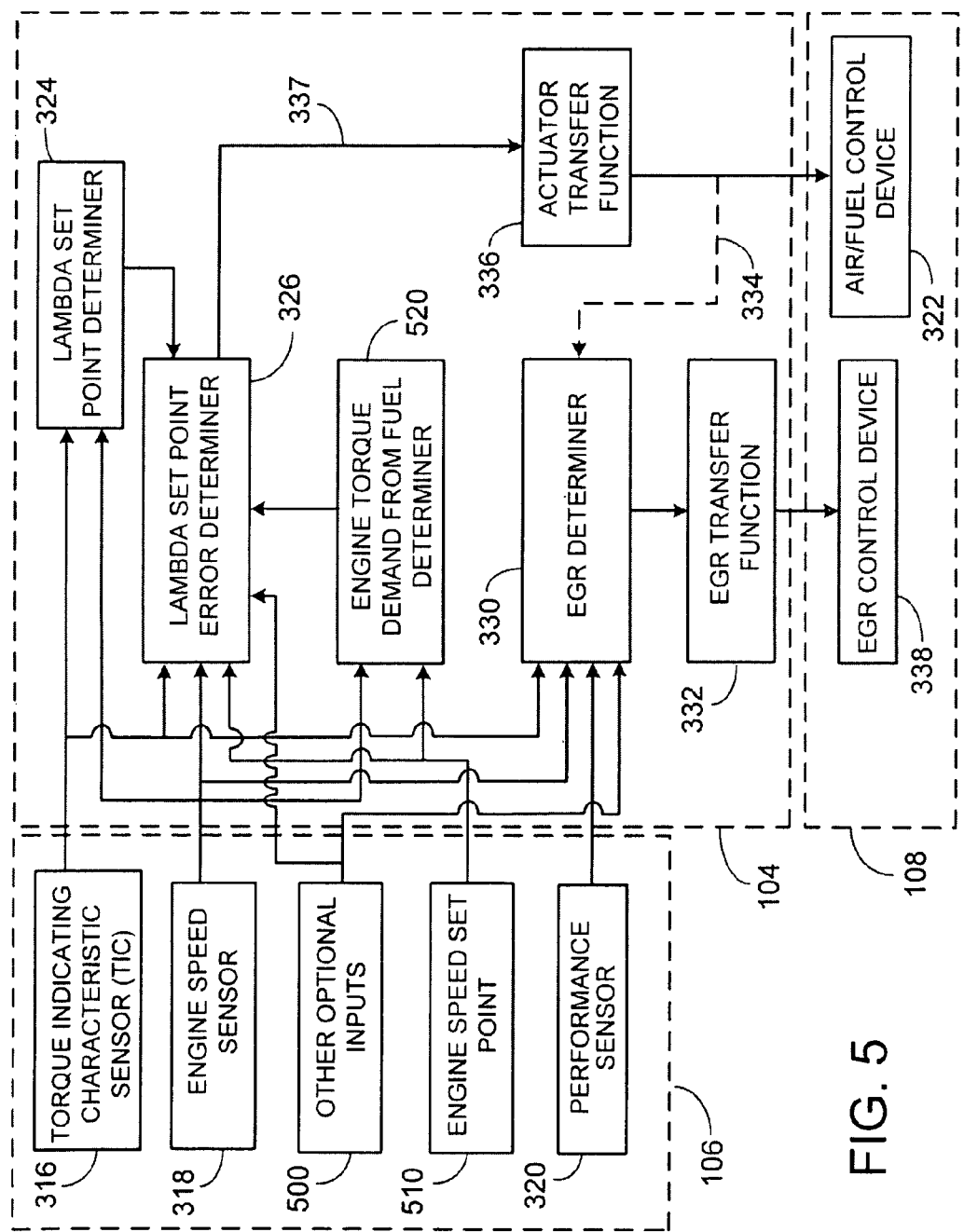
FIG. 5 is a schematic of the functional operation of an alternate illustrative ECM.

FIG. 5 illustrates an alternate implementation including a lambda set-point error determiner 326 and a torque demand from fuel determiner 520. The lambda set-point error determiner 326 receives an input from the torque demand from fuel determiner 520, the engine speed sensor 318, and engine speed set-point 510. The lambda set-point error determiner 326 may also receive an input from other optional inputs 500. In some instances, the lambda set-point error determiner 326 may also receive an input from the lambda sensor 328 and lambda set-point determiner 324 (not shown in FIG. 5). The lambda set-point error determiner 326 determines an approximation or estimate of the actual lambda condition of the engine 102 and determines an error between the determined lambda set-point and the actual lambda estimate. The determined error is used to increase or decrease the lambda set-point, such as, for example, in response to transient engine operating conditions. The torque demand from fuel determiner 520 determines, based on engine state parameters, such as engine speed and engine speed set-point, the amount of fueling change (momentary increase or decrease in lambda set-point) to be used in achieving the specified acceleration or deceleration in torque or engine speed (hereinafter referred to as "torque from fuel"). According to one implementation, the torque demand from fuel determiner 520 determines the torque from fuel value by utilizing outputs from the engine speed sensor 318 and the engine speed set-point 510. The lambda set-point error determiner 326 utilizes the torque from fuel to determine a lambda adjustment 337, if any, to control operation of the engine 102 under the changing conditions. The lambda set-point error determiner 326 outputs the lambda adjustment 337 to the actuator transfer function 336 to determine an air/fuel actuator control signal adapted to operate the air/fuel control device 322.

Figure 6:
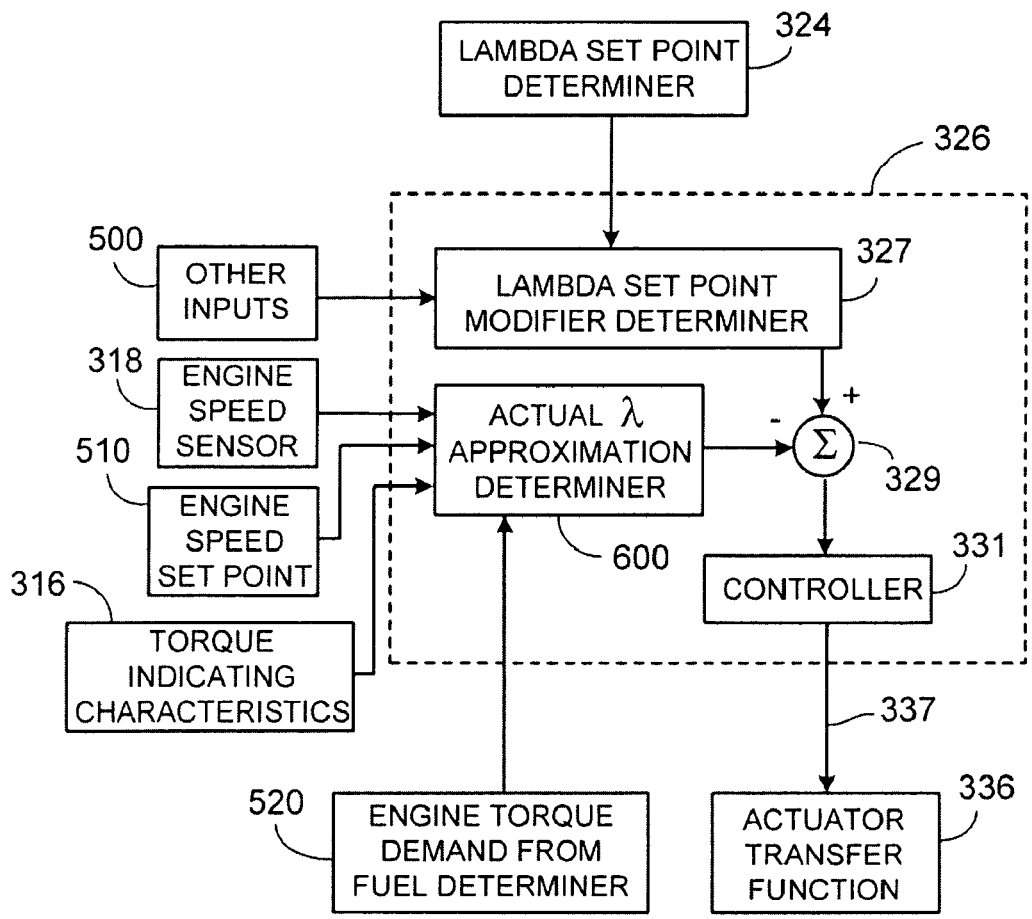
FIG. 6 is another example implementation of a lambda set-point error determiner.

A further example of the lambda set-point error determiner 326 is shown in FIG. 6. In this example, the lambda set-point error determiner 326 includes lambda actual lambda approximation determiner 600, controller 331, and summing function 329. The actual lambda approximation determiner 600 may receive inputs from the engine speed sensor 318, engines speed set-point 510, the torque indicating characteristic 316, and the engine torque demand from fuel determiner 520 to determine an actual lambda approximation. The actual lambda approximation may be determined using a look-up table or, alternately, in combination with a look-up table, the actual lambda approximation may be determined using a formulaic calculation. In some implementations, the lambda set-point error determiner 326 may also include the lambda set-point modifier determiner 327. As explained, the lambda set-point modifier determiner 327 may be operable to determine a lambda set-point modifier to modify the determined lambda set-point based on one or more optional inputs 500, such as one or more of the optional inputs listed above. In addition to determining the lambda set-point modifier using a look-up table and/or a formulaic calculation, the lambda modifier may also be value-specific to a particular lambda set-point. That is, the lambda modifier may be applied only to a single lambda set-point output by the lambda set-point determiner 324 and not to any other lambda set-point subsequently output by lambda set-point determiner 324. According to a further implementation, the lambda modifier may be applied globally to all subsequently determined lambda set-points for a specified period or to a defined group of lambda set-points according to one or more conditions. In other implementations, the lambda set-point modifier determiner 327 may be omitted.

The summing function 329 receives the lambda set-point (sent from lambda set-point determiner 324 or as modified by the lambda set-point modifier determiner 327) and the actual lambda approximation from the actual lambda approximation determiner 600. As explained, the summing function 329 determines an error or difference, if any, between the determined lambda set-point and the actual lambda approximation. Any determined difference is sent to the controller 331. The controller 331 may be of a type described above, such as a PID controller. The controller 331 and, hence, the lambda set-point error determiner 326, outputs a lambda adjustment 337 that is sent to the actuator transfer function 336.

As explained above, the actuator transfer function 336 receives at least the lambda adjustment 337 and determines an air/fuel actuator control signal adapted to operate the air/fuel control device 322 (shown, for example, in FIG. 5). The actuator transfer function 336 can receive and account for other inputs in determining the air/fuel actuator control signal, such as the engine state parameters discussed above, fuel pressure, ambient pressure, intake temperature, ambient temperature, and others. The actuator transfer function 336 may determine the air/fuel actuator control signal using a look-up table correlating lambda set-points, fuel parameters, and any other inputs to affect the air/fuel actuator control signals, by calculation as a function of the lambda set-point, and any other inputs, by a combination of a look-up table and a calculation, or by another method. In one illustrative ECM 104, the lambda set-point may be transformed to a pre-signal using a look-up table, and a different parameter applied, such as a fuel parameter, in a calculation to adjust the pre-signal in determining the air/fuel actuator control signal. Alternately, a signal, such as the fuel parameter, may be applied as an adder (negative or positive) or multiplier to the lambda set-point and the air/fuel actuator control signal determined using a look-up table or by calculation as a function of the lambda set-point and any other inputs.

The lambda set-point determiner 324 may optionally include feed forward compensation by communicating with a load or a controller for a load (not shown) applied to the engine to derive a load coming signal. In this instance, the lambda set-point determiner 324 will receive a load coming signal indicating changes in loading, and optionally the magnitude of the load coming, as an optional input 500. Using the load coming signal, the lambda set-point determiner 324 can anticipate engine output requirements based on upcoming changes in load communicated by the load coming signal and adjust the determined air/fuel mixture in anticipation of the upcoming changes in load. An example of a feed forward compensation that can be used in the engine system 100 is disclosed in U.S. Pat. No. 6,564,774, entitled Feedforward Engine Control Governing System.

Referring to FIGS. 3 and 5, the ECM 104 may also include an EGR determiner 330 that determines an amount of exhaust gas to recirculate into the combustion chamber of the engine 102. The EGR determiner 330 determines the amount of exhaust gas to recirculate into the engine 102 in relation to a total amount of a diluent component (i.e., the diluent or diluents) in the intake charge supplied to the combustion chamber of the engine. The EGR determiner 330 may utilize a difference between a specified amount of exhaust gas and a determination of the amount of diluent in the intake charge. The specified amount of exhaust gas may be different for different operating conditions. In certain instances, the EGR determiner 330 may determine the specified amount of exhaust gas using a look-up table in the memory of the ECM 104 including values indicative of engine speed and torque indicating characteristics correlated to specified amounts of exhaust gas. Alternately or in combination with a look-up table, the EGR determiner 330 may determine the specified amount of exhaust gas using a formulaic calculation as a function of inputs from one or more of the sensors 106, for example, engine speed and/or torque indicating characteristic.

In certain instances, the EGR determiner 330 may determine the total amount of the diluent component in the intake charge utilizing a determination of a total amount of the intake charge in the combustion chamber of the engine and a determination of a total amount of an air component (i.e., oxygen or air used in combustion) of the intake charge. Optionally, the EGR determiner 330 may also use a determination of a total amount of a fuel component (i.e., the fuel or fuels used in combustion) of the intake charge in determining the total amount of the diluent component in the intake charge. In instances where the fuel component is in the form of a gas, it may be desirable to use the fuel component in determining the total amount of the diluent component. In instances where the fuel component is in the form of liquid, mist and/or vapor, it may be desirable to omit the fuel component in determining the total amount of the diluent component. The total amount of the intake charge is approximately equal to the total amount of the diluent component and the total amount of the air component or approximately equal to the total amount of the diluent component, the total amount of the air component and the total amount of the fuel component. Thus, the total amount of the diluent component can be determined by subtracting the total amount of the air component from the total amount of the intake charge or by subtracting the total amount of the air component and the total amount of the fuel component from the total amount of the intake charge (depending on whether the amount of fuel component is being accounted for).

The total amount of the intake charge and the total amount of the air component or the total amount of the intake charge, the total amount of the air component and the total amount of the fuel component are related by a formulaic calculation based on or derived from the speed/density equation. Thus, various implementations of the EGR determiner 330 need not receive inputs indicative of each of the total amount of the intake charge, the total amount of the air component and the total amount of the fuel component, because given two of the three, the third can be determined by calculation. If the fuel component is not being accounted for, given either the total amount of the air component or the total amount of the intake charge, the other can be determined by calculation. In certain instances, the formulaic calculation can be based on or derived from the following formula:

$$\dot{n}_{tot} = \eta_{vm} \cdot P \cdot V_d \cdot RPM/(120 \cdot \overline{R} \cdot T), \text{ where:}$$

$\dot{n}_{tot}$ is the molar flow rate [moles/s] of intake charge,
$\eta_{vm}$ is the molar based volumetric efficiency of the engine,
P is the absolute intake manifold pressure [Pa],
$V_d$ is the engine displacement [m³],
RPM is the engine speed [RPM],
$\overline{R}$ is the ideal gas constant of 8.31434 J/mol*K, and
T is the absolute intake temperature [K].

The EGR determiner 330 of FIG. 3 receives inputs from the torque indicating characteristic sensor 316 and/or the performance sensor 320, the engine speed sensor 318, and the lambda sensor 328 in determining the amount of diluent in the intake charge and, ultimately, an adjustment (i.e., updated set-point) to the EGR control device 338.

If provided, the performance sensor 320 outputs a signal corresponding to a power and/or torque output from the engine 102 measured from outputs of the engine (i.e., for use in determining an output-based determination of power) to the ECM 104. In certain instances, the performance sensor 320 outputs a signal that is directly indicative of power (i.e., from which an absolute (versus relative) value of the power output of the engine 102 can be determined) or that can be combined with state variables from other sensors to be directly indicative of power (e.g., power is function of torque and engine speed and is also a function of BMEP, engine speed and engine displacement). In other instances, the performance sensor 320 outputs a signal that is indirectly indicative of power (e.g., from which an inference can be made about a relative determination (increasing or decreasing) of power output of the engine 102). Some examples of performance sensor 320 include a kilowatt sensor coupled to a generator driven by the engine 102, a sensor adapted to measure the load on the engine, or other power sensor. In an instance where the performance sensor 320 is a kilowatt sensor coupled to a generator driven by the engine 102, the absolute power output by the engine 102 can be determined as a function of the efficiency of the generator. In certain instances, the absolute power output by the engine 102 is the kilowatt sensor output times the efficiency of the generator. The generator efficiency may be a value that is stored in the ECM 104. In certain instances, the generator efficiency may be a user-inputted value.

The input from the torque indicating characteristic sensor 316 and/or the performance sensor 320 is indicative of the performance (e.g., power output) of the engine. The EGR determiner 330 determines the total amount of the fuel component, for example, using a formulaic calculation as a function of the performance of the engine determined from the torque indicating characteristic sensor 316 and/or the performance sensor 320, the engine's efficiency and the energy density of the fuel. For example, the EGR determiner 330 can determine the amount of the fuel component by dividing the power output by the engine by the energy density of the fuel and efficiency of the engine. In certain instances, the engine's efficiency and energy density of the fuel are experimentally determined values stored in a memory of the ECM 104. In certain instances, the energy density of the fuel may be a user-inputted value.

The EGR determiner 330 determines the total amount of the air component, for example, using a formulaic calculation as a function of the air/fuel ratio determined from the lambda sensor 328, the stoichiometric ratio of the fuel and the determined amount of the fuel component. For example, the EGR determiner 330 can determine the amount of the air component by multiplying the air/fuel ratio times the amount of the fuel component. In certain instances, the stoichiometric ratio of the fuel is stored in a memory of the ECM 104. In certain instances, the stoichiometric ratio of the fuel is a user-inputted value.

The EGR determiner 330 determines the total amount of the intake charge based on the total amount of the air component or the total amount of the air component and the total amount of the fuel component using the formulaic calculation based on or derived from the speed/density equation discussed above. The EGR determiner 330 then determines the total amount of diluent in the intake charge from the total amount of intake charge and the total amount of the air component or the total amount of intake charge, the total amount of the air component and the total amount of the fuel component. For example, the EGR determiner 330 can determine the amount of the diluent component by subtracting the total amount of the air component or the total amount of the air component and the total amount of the fuel component (if the fuel component is being accounted for) from the total amount of the intake charge.

Although the EGR determiner 330 described above utilizes inputs from the torque indicating characteristic sensor 316 and/or the performance sensor 320, the engine speed sensor 318, and the lambda sensor 328 in determining the amount of diluent in the intake charge, a number of different combinations of inputs can be used to determine the total amount of diluent in the intake charge. Therefore, other implementations of the EGR determiner 330 can operate similarly to determine the total amount of the diluent component in the intake charge, but using different inputs. For example, the total amount of the air component can be determined by measuring the amount of the air component (e.g., via a mass air flow sensor (MAF) and/or other sensor) and/or from the state of a control device associated with the air component (e.g., via a throttle position sensor and/or other). In certain instances, additional inputs or information may be used in determining the total amount of the air component. The total amount of the fuel component can be determined by measuring the amount of the fuel component (e.g., a fuel mass flow sensor and/or other sensor) and/or from the state of a control device associated with the fuel component (e.g., a pulse width or duty cycle of one or more fuel or air and fuel control devices (collectively "air/fuel control devices"), such as fuel injectors or fuel mixer). In certain instances, additional inputs or information may be used in determining the total amount of the fuel component. In instances where one of the total amount of the air component or the fuel component, the other can be determined using the air/fuel ratio (e.g., determined using a lambda sensor and the stoichiometric ratio of the fuel component and/or other sensors). Therefore, in certain implementations, the EGR determiner 330 can determine the total amount of diluent based on inputs from a torque indicating sensor and/or a power sensor to determine the total amount of the fuel component, as described above, and input from a MAF sensor to determine the total amount of the air component. In certain implementations, the EGR determiner 330 may determine the total amount of diluent based on inputs from a torque indicating sensor and/or a power sensor to determine the total amount of the fuel component, as described above. Also, the EGR determiner may determine the total amount of air component by utilizing input from a lambda sensor in combination with the total amount of the fuel component. In certain implementations, input from a MAF sensor may be used to determine the total amount of the air component and input from a lambda sensor, in combination with the total amount of the air component, can be used to determine the total amount of the fuel component. In like fashion, other combinations of inputs can be used to determine the total amount of the air component and the fuel component. Some additional example combinations include a MAF sensor and a fuel mass flow sensor, a MAF sensor and a duty cycle of one or more fuel injectors or a fuel mixer, a lambda sensor and a fuel mass flow sensor, and/or a lambda sensor and a duty cycle of one or more fuel injectors or a fuel mixer, and other combinations. For example, the duty cycle of one or more fuel injectors or the fuel mixer may be represented by the output from the actuator transfer function 336 (shown as input 334 to the EGR determiner 330 in FIGS. 3 and 5).

Once the total amount of the diluent component is determined, the EGR determiner 330 determines a set-point for the amount of exhaust gas to recirculate into the engine 102 by comparing the total amount of the diluent component in the intake charge to the specified amount of exhaust gas at the current operating conditions of the engine 102. For example, if the total amount of the diluent component is less than the specified amount, the EGR determiner 330 may determine to increase the amount of exhaust gas recirculated into the engine 102 or increase the EGR flow rate. If the total amount of the diluent component is greater than the specified amount, the EGR determiner 330 may determine to decrease the amount of the exhaust gas recirculated into the engine 102 or reduce the EGR flow rate. In certain instances, the EGR determiner 330 may determine an amount to increase or decrease the amount of exhaust gas recirculated to the engine 102 in proportion to the difference between the total amount of the diluent component and the specified amount. In certain instances, the EGR determiner 330 may increase or decrease the amount of exhaust gas recirculated to the engine 102 a set amount, and iteratively adjust (repeatedly performing the operations above) until the total amount of the diluent component is equal to or substantially equal to the specified amount. The EGR determiner 330 outputs an EGR set-point signal corresponding to the determined set-point.

While the amount of NOx emissions produced by an engine are primarily controlled by an amount of EGR (i.e., the amount of EGR present in a combustion chamber of the engine), NOx emissions are also dependent on the Intake Manifold Temperature (IMT), coolant temperature, fuel quality, and ambient or intake manifold humidity. NOx emissions, though, may also be affected (e.g., increased) by higher IMT, coolant temperature, lower humidity, and fuel having a higher flame speed. Thus, to maintain a constant level of NOx emissions with changing IMT, coolant temperature, and humidity, an output of the EGR determiner 330 may be modified by outputs from sensors operable to measure coolant temperature, IMT, fuel quality, or humidity.

Engine knock is potentially damaging to an engine and may be caused by abnormal combustion. One knock mitigation remedy is retarding spark timing. Retarding spark timing, though, increases the IMAP. This, in turn, causes the EGR control method to reduce EGR flow rate, which is counter productive in preventing knock. Thus, according to certain implementations, the output of the EGR determiner 330 may be prevented from changing the EGR rate during a knock event or modified to increase EGR flow rate during a knocking event, since an increased EGR flow rate can inhibit knock. After the knock event has passed, the operation of the EGR determiner 330 may return to normal.

An EGR transfer function 332, that in one implementation is included with the ECM 104, receives at least the EGR set-point signal and determines an EGR actuator control signal adapted to operate the EGR control device 338.

The EGR transfer function 332 may determine the EGR actuator control signal using a look-up table correlating, for example, throttle position, lambda set-points, fuel parameters, and any other inputs to affect the EGR actuator control signals; by calculation as a function of the EGR set-point, and any other inputs; by a combination of a look-up table and a calculation; or by another method. According to one implementation, the EGR set-point can be transformed to a pre-signal using a look-up table, and a different parameter applied, such as a fuel parameter, in a calculation to offset the pre-signal in determining the EGR actuator control signal.

Accordingly, certain implementations include functionality to actively control an amount of EGR introduced into an engine depending upon operating conditions of the engine, such as a torque indicating characteristic, an engine speed, a power output of the engine, an input-based determination of power output of the engine, an air/flow actuator control signal, and others, such as an air/fuel mixture temperature, for example. Further, certain implementations are capable of adjusting the air/fuel mixture and EGR of an engine to operate the engine at high efficiency levels and reduce NOx emission levels when the engine is operating both under steady state conditions or transient conditions.

Moreover, implementations described herein may be used with any spark-ignited internal combustion engine, such as a gasoline-powered engine, or a compression ignition internal combustion engine, such as a Diesel engine. The implementations described herein may also be used with any fuel, such as gasoline, Diesel, biodiesel, natural gas, propane, ethanol, alternative fuels, such as vegetable oils, biogas, pyrolysis gas, and other fuels.

Additionally, the implementations described herein are applicable to an engine 102 having a turbocharger. In such an engine, the EGR may be diverted from exhaust gas prior to entering the turbocharger, after exiting the turbocharger, or a combination of both.

Although the implementations described herein are described in the context of exhaust gas as the diluent being controlled, the concepts herein are applicable to controlling other types of diluent alone or in combination with exhaust gas.

Figure 7:
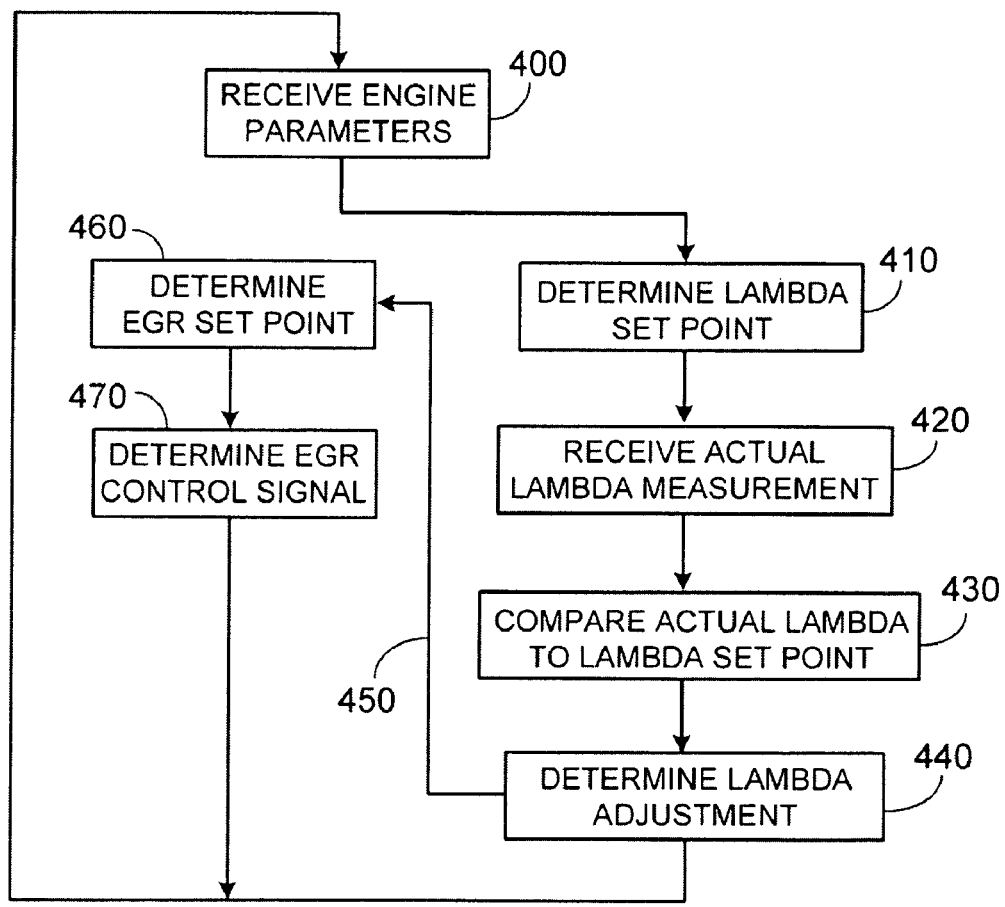
FIG. 7 is a flow diagram of an illustrative operation of an ECM.

FIG. 7 schematically depicts the operation of the ECM 104 in controlling the exhaust gas recirculated to the engine. At 400, the ECM receives signals indicative of one or more engine state parameters. As described above, the engine state parameters may include engine speed, an engine torque indicating parameter, such as IMAP or IMD, power output of the engine 102, a characteristic indicative of the engine's 102 air to fuel ratio, such as exhaust oxygen content, ambient and/or engine temperature, ambient pressure, and others.

At 410, the ECM utilizes at least one or more of the engine state parameters to determine a lambda set-point. As explained above, the lambda set-point may or may not be modified based on other optional inputs. At 420, the ECM receives an actual lambda measurement, such as using an output from an exhaust oxygen content sensor, e.g., a lambda sensor disposed within an exhaust flow of the engine. As also explained above, an actual lambda approximation may be used. At 430, the ECM compares the actual lambda measurement with the lambda set-point. If the ECM determines a difference between the lambda set-point and the actual lambda measurement, a lambda adjustment is determined at 440, which is used to adjust the air/fuel control device based on the determined difference. Alternatively, the ECM 104 utilizes the torque from fuel in the manner described above to determine any necessary lambda adjustments.

Additionally, the ECM utilizes at least one or more of the engine state parameters to determine an EGR set-point at 460 using lambda adjustment, shown at 450. As explained above, in certain implementations, the EGR set-point may be determined by comparing a determination of the total amount of diluent component in the intake charge to a specified amount. After the ECM determines the EGR set-point at 460, the ECM determines an EGR control signal at 470.

The tasks 410-440 may be performed substantially concurrently with the tasks 460-470, in sequence before or after 460-470, or at any other time. Further, tasks 410-440 and 460-470 may be repeated continually in regular intervals or when changes in engine state parameters are detected.

Implementations of the engine system described herein can include some, all or none of the following features. For example, the engine system may be able to actively control an amount of EGR introduced into an engine so as to improve fuel efficiency. Further, the engine system may be able to reduce NOx emissions by actively controlling the amount of EGR introduced into the engine. Accordingly, the engine system provides for more efficient engine operation and reduced emissions.

A number of implementations have been described. Nevertheless, it will be understood that various modifications may be made. Accordingly, other implementations are within the scope of the following claims.

What is claimed is:

1. A method for controlling an engine, comprising:
   determining an amount of a fuel in a fuel component of an intake charge using at least a power output of the engine, the fuel component comprising the fuel and a fuel diluent;
   determining an amount of an air component of the intake charge based on the determined amount of the fuel;
   determining an amount of the intake charge provided, during operation of the engine, to a combustion chamber of the engine, the intake charge comprising the air component, the fuel, and a total amount of diluent comprising the fuel diluent and a diluent flow;
   determining the total amount of diluent of the intake charge utilizing the amount of the intake charge, the amount of the air component, and the amount of the fuel; and
   adjusting an amount of the diluent flow supplied to the intake charge based at least in part on the determined total amount of the diluent of the intake charge.

2. The method of claim 1, further comprising determining the amount of the fuel component of the intake charge.

3. The method of claim 2, wherein determining the amount of the fuel component of the intake charge comprises utilizing a duty cycle of an air/fuel control device of the engine.

4. The method of claim 1, wherein adjusting an amount of the diluent flow supplied to the intake charge comprises adjusting an amount of exhaust gas introduced into the intake charge.

5. The method of claim 1, wherein determining an amount of the air component of the intake charge comprises utilizing a mass air flow sensor of the engine.

6. The method of claim 1, wherein determining an amount of the air component comprises utilizing a lambda sensor of the engine.

7. The method of claim 1, wherein determining an amount of the intake charge provided, during operation of the engine, to a combustion chamber of the engine comprises calculating the amount of the intake charge as a function of engine volumetric efficiency, a flow rate of the air component, a density of the air component, and engine speed.

8. The method of claim 1, wherein adjusting an amount of the diluent flow supplied to the intake charge comprises adjusting the amount of the diluent flow supplied to the intake charge to be substantially equal to a specified amount.

9. The method od claim 1, wherein the diluent flow comprises a flow of exhaust gas.

10. The method of claim 1, wherein the total amount of diluent of the intake charge comprises an amount of diluent in the air component, the fuel diluent, and the diluent flow supplied to the intake charge.

11. The method of claim 1, wherein the fuel is a hydrocarbon fuel.

12. The method of claim 1, further comprising measuring the power output of the engine with one or more of a kilowatt sensor, a torque sensor, or an engine speed sensor.

13. The method of claim 1, wherein determining an amount of the intake charge provided, during operation of the engine, to a combustion chamber of the engine comprises calculating the intake charge as a function of absolute intake manifold pressure, absolute intake temperature, engine speed, and volumetric efficiency of the engine.

14. An engine control module comprising:
a processor; and
a memory storing instructions for the processor that cause the processor to perform operations comprising:
determining an amount of a fuel of a fuel component of an intake charge using at least a power output of the engine, the fuel component comprising the fuel and a fuel diluent;
determining an amount of an air component of the intake charge based on the determined amount of the fuel;
determining an amount of the intake charge provided, during operation of the engine, to a combustion chamber of the engine, the intake charge comprising the air component, the fuel, and a total amount of diluent comprising the fuel diluent and an amount of exhaust gas;
determining the total amount of diluent of the intake charge utilizing the amount of the intake charge, the amount of the air component, and the amount of fuel; and
adjusting the amount of the exhaust gas supplied to the intake charge based at least in part on the determined total amount of the diluent of the intake charge and a specified amount of exhaust gas.

15. The engine control module of claim 14, wherein the operations further comprise determining the amount of the fuel component of the intake charge.

16. The engine control module of claim 15, wherein determining the amount of the fuel component of the intake charge comprises utilizing a duty cycle of an air/fuel control device of the engine.

17. The engine control module of claim 14, wherein determining an amount of the air component of the intake charge comprises utilizing a mass air flow sensor of the engine.

18. The engine control module of claim 14, wherein determining an amount of the air component comprises utilizing a lambda sensor of the engine.

19. The engine control module of claim 14, wherein determining the amount of the intake charge provided, during operation of the engine, to a combustion chamber of the engine comprises calculating the amount of the intake charge as a function of engine volumetric efficiency, flow rate of the air component, density of the air component, and engine speed.

20. The engine control module of claim 14, wherein the total amount of diluent of the intake charge comprises an amount of diluent in the air component, the fuel diluent, and the diluent flow supplied to the intake charge.

21. The engine control module of claim 14, wherein determining an amount of the intake charge provided, during operation of the engine, to a combustion chamber of the engine comprises calculating the intake charge as a function of absolute intake manifold pressure, absolute intake temperature, engine speed, and volumetric efficiency of the engine.

* * * * *